United States Patent Office 3,695,898
Patented Oct. 3, 1972

3,695,898
SWEETENING COMPOSITIONS CONTAINING
SACCHARIN AND DIPEPTIDES
John A. Hill, New Brunswick, and Anthony L. La Via,
East Brunswick, N.J., assignors to E. R. Squibb & Sons,
Inc., New York, N.Y.
No Drawing. Filed Mar. 25, 1970, Ser. No. 22,686
Int. Cl. A23l 1/26
U.S. Cl. 99—141 A
13 Claims

ABSTRACT OF THE DISCLOSURE

Sweetening compositions which mask the aftertaste of saccharin and potentiate its sweet taste contain saccharin together with an amount of a sweet tasting dipeptide in a quantity effective to mask the aftertaste of saccharin.

BACKGROUND OF THE INVENTION

Saccharin is commonly employed as a sugar substitute but suffers the drawback of having an objectionable bitter, metallic aftertaste. It has been reported that from one-quarter to one-third of the population are "saccharin sensitive" and perceive an off-taste regardless of the saccharin concentration. It has also been reported that the incidence of off-taste due to saccharin is a function of the concentration of the compound and that everyone can be expected to obtain an off-taste from saccharin at some concentration. It has been suggested to eliminate the aftertaste by combining saccharin with such ingredients as pectin or sorbitol, dextrose, meltose, etc., but such a combination has not overcome the problem. Combinations containing saccharin and salts of cyclamates in certain proportions, while widely used, have also failed to overcome the problem of objectionable aftertaste.

On a weight for weight basis saccharin at its threshold level of sweetness is about 700 times as sweet as sucrose. This greatly enhanced sweetness of saccharin relative to sucrose decreases as the concentration of saccharin increases. At normal use levels saccharin is only 150–200 times as sweet a sucrose. Consequently, to obtain a given increase in sweetness level with saccharin it is necessary to employ a proportionately greater concentration of saccharin. This increased level of saccharin causes a larger segment of the population to perceive an objectionable aftertaste. While individuals vary in the degree to which they find the aftertaste of saccharin objectionable, the occurrence of the objection is so widespread that considerable effort has been expended in devising formulations to overcome this problem. The problems caused by the aftertaste of saccharin are compounded in products such as preserves, jams and jellies which normally have sugar concentrations up to 60 to 75%. Substituting a quantity of saccharin which gives a sweetness equivalent to this quantity of sugar results in a noticeably undesirable aftertaste.

OBJECTS OF THE INVENTION

It is, accordingly, an object of the present invention to provide sweetening compositions containing saccharin in which the aftertaste due to saccharin is masked. Another object is to provide sweetening compositions containing saccharin which have a taste which is free of objectionable flavor qualities. A further object is to provide sweetening compositions containing saccharin which have a taste comparable to or superior to that of sugar. These and other objects of the present invention will be apparent from the following description.

SUMMARY OF THE INVENTION

It has now been found that the aftertaste of saccharin is masked by adding a sweet tasting dipeptide to saccharin. The dipeptide need be present in only very small quantities. Even when present in undetectable amounts, that is, amounts below their threshold level of taste, the dipeptides of the present invention begin to manifest their effectiveness in overcoming the objectionable aftertaste due to saccharin.

DETAILED DESCRIPTION

The dipeptide sweetening agents employed according to the present invention are superior to sucrose in sweetness and possess a lingering sweetness which has been found by taste panel evaluation to be preferable to that of sucrose. The dipeptides of the present invention have the surprising ability of masking the bitterness and potentiating the sweet taste of saccharin. This effect has long been sought for and although many formulations have been stated to achieve it, this effect has heretofore not been attained. The dipeptide sweetening agents of the present invention have a fairly constant ratio of sweetness to that of sucrose over all sweetness levels. Saccharin, on the other hand, is found to be 700 times as sweet as sucrose when both are compared at their threshold levels of sweetness but only 150 to 200 times as sweet as sucrose at normal use levels.

The dipeptides of the present invention are L-aspartyl dipeptides of the formula

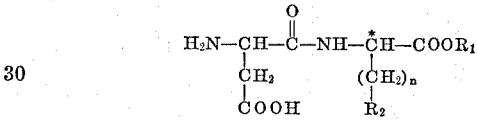

wherein the carbon marked with an asterisk is of the L-configuration, $n$ is an integer from 0 to 5, $R_1$ is an alkyl radical of up to 6 carbon atoms, an alkyl-aryl or alicyclic radical of up to 10 carbon atoms, and $R_2$ is a mono- or di-unsaturated alicyclic radical of up to 8 carbon atoms, or when $n$ is 0, a phenyl radical.

Examples of some specific peptides are L-aspartyl-2,5-dihydro-L-phenylalanine, L-aspartyl-L-(1-cyclohexene-1)-alanine, L-aspartyl-L-phenylglycine, and L-aspartyl-L-2,5-dihydrophenylglycine. The alkyl radical $R_1$ may be methyl, ethyl, n-propyl, i-propyl, n-butyl, i-butyl, n-pentyl, 2-methyl-n-butyl, neopentyl, n-hexyl, 2-methyl-n-pentyl, 3-methyl-n-pentyl, 2,2-dimethyl-n-butyl and 2,3-dimethyl-n-butyl.

The dipeptides of the present invention demonstrate an effect in masking the aftertaste of saccharin when present in an amount as little as about 2% that of the saccharin. Amounts greater than 2% may, of course, be used. The minimum amount needed will vary depending on the sweetness of individual dipeptides relative to sugar. This amount, however, may be readily determined by taste tests. The taste of the composition improves as the amount of dipeptide is increased. The upper limit of dipeptide is determined not by taste consideration alone, but rather by other factors such as cost and solubility. The dipeptides of the present invention are more expensive than saccharin. For many applications, e.g., soft drinks, a relatively expensive sweetening agent cannot be employed. In such situations the quantity of dipeptide employed will be at least that level or near that level at which masking of the saccharin aftertaste begins. In most applications, e.g., drugs and medicinals where cost considerations are not as critical, higher amounts of dipeptide may be employed. Another factor limiting the amount of dipeptide which may be employed is that of solubility as there is little to be gained by employing the dipeptide at levels beyond its solubility. Generally, the dipeptides of the present invention are used in an amount of about 1 part of dipeptide to from about 1 part to about 50 parts of saccharin, preferably about 1 part of dipeptide to from about 1.5 parts to about 15 parts of saccharin, and most preferably from about 1 part of saccharin to from about 2.5 parts to about 12 parts of saccharin.

The compositions of the present invention may be used to impart their sweetness to a variety of comestibles including food products, liquids, and pharmaceutical preparations. Examples of such food products are fruits, vegetables, juices, meat products such as ham or bacon, sweetened milk products, egg products, salad dressings, ice creams and sherbets, icings, syrups, cake mixes, pastry mixtures, gelatin, chewing gum, and candy. Liquids include beverages such as carbonated and noncarbonated soft drinks, wines, and liquers.

Examples of pharmaceutical preparations are orally administered suspensions of antibiotics, e.g., penicillin, ampicillin, nystatin or oxytetracycline; liquid vitamin preparations; and syrups, e.g., cough syrup; tooth paste; mouth wash; etc.

The compositions of the present invention are stable, water-soluble compositions which may be utilized under various physical forms, for example, as powders, liquids or pastes. They may also be used with liquid or solid carriers such as water, glycerin, sorbitol, starch, salt, citric acid or other appropriate pharmaceutically acceptable non-toxic carriers.

The saccharin may be employed in the form of pharmaceutically acceptable alkali metal salt, ammonium salt, or amine salts, e.g., the N-methylglucamine salt, or the alkaline earth metal salt, or as the free acid.

In the peptides of the present invention $R_1$ may be, as mentioned previously, alkyl-aryl or an alicyclic radical of up to 10 carbon atoms. Examples of alkyl-aryl radicals are benzyl, phenethyl, isopropylphenyl, 3-phenylpropyl and isopropylbenzyl. Examples of alicyclic radicals are cyclopropyl, cyclobutyl, cyclopentyl, cyclohexyl, cycloheptyl and cyclooctyl.

The following examples illustrate the present invention without, however, limiting the same thereto.

EXAMPLE 1

Four 8 oz. samples of black coffee are prepared and the samples sweetened, respectively, with the following sweetening agents:

EXAMPLE 1

| Sweetening Agent | | Grams | Percent |
| --- | --- | --- | --- |
| A | Sucrose | 19.2 | 8 |
| B | Sodium saccharin | 0.036 | 0.015 |
| C | Sodium saccharin | 0.024 | 0.01 |
|   | and | | |
|   | L-aspartyl-L-phenylglycine methyl ester | 0.144 | 0.06 |
| D | Sodium saccharin | 0.024 | 0.01 |
|   | and | | |
|   | L-aspartyl-L-phenylglycine methyl ester | 0.072 | 0.03 |

The sample containing sucrose is taken as the standard for purposes of comparison.

The taste of the B sample sweetened solely with sodium saccharin is evaluated as poor due to the noticeable aberrant taste quality of the saccharin.

The sample sweetened with mixture "C" of saccharin and dipeptide is found to be over sweet. The aberrant taste aspects due to saccharin, however, are not detected.

The sample sweetened with the mixture "D" has a sweetness comparable to that of the sucrose, but with the added advantage of a better quality of taste. The aberrant taste aspects due to saccharin are not detected.

EXAMPLE 2

A solution is prepared containing 0.3 mg. of sodium saccharin and 0.025 mg. of L-aspartyl-L-phenylglycine, methyl ester, in 5 ml. of water. The solution contains .006% sodium saccharin and .0005% of the dipeptide, the ratio of the two materials being 12:1. The concentration of the saccharin is equal to the threshold level at which the bitter aftertaste is detectable while the concentration of the dipeptide is one-tenth that of its threshold level of sweetness. Taste tests on this solution do not reveal any of the aftertaste normally found with solutions containing this quantity of saccharin.

EXAMPLE 3

A solution is prepared containing 0.3 mg. of sodium saccharin and 0.05 mg. of L-aspartyl-L-phenylglycine, methyl ester, in 5 ml. of water. The concentration of saccharin (.006%) is equal to the threshold level for its bitter aftertaste, while the concentration of the dipeptide (.001%) is about one-fifth that of its threshold level of sweetness. With this ratio (6:1) of saccharin to dipeptide there is effective masking of the biter aftertaste of saccharin. The sweetness quality of the solution is evaluated as better than that of Example 2.

EXAMPLE 4

A solution is prepared containing 0.3 mg. of sodium saccharin and 0.1 mg. of L-aspartyl-L-phenylglycine, methyl ester in 5 ml. of water. At this ratio (3:1) of sodium saccharin to dipeptide there is effective masking of the saccharin aftertaste. The sweetness quality of the solution is evaluated as better than that of Example 3 and as better than that of sucrose alone.

EXAMPLE 5

A solution is prepared containing 0.3 mg. of sodium saccharin and 0.00625 mg. of L-aspartyl-2,5-dihydro-L-phenylalanine, methyl ester, in 5 ml. of water. The solution contains .006% sodium saccharin and .000125% of the dipeptide, the ratio of the two materials being 48:1. The concentration of the dipeptide is one-tenth that of its threshold level of sweetness. Taste tests on this solution do not reveal any of the aftertaste normally found with solutions containing this quantity of saccharin.

EXAMPLE 6

A dry mix is prepared by blending 5.5 g. of the potassium salt of penicillin G, 0.5 g. of sodium saccharin, 0.25 g. of the methyl ester of L-aspartyl-L-phenylglycine, and 58.0 g. of fine granulated sugar. A syrup for oral administration is then prepared by adding to the dry mix sufficient water to make 100 ml. The reconstituted syrup has an improved and enhanced sweetness character due to the dipeptide.

EXAMPLE 7

A concentrated liquid sweetener is prepared containing the following ingredients:

| | G. |
| --- | --- |
| Sodium saccharin | 18.0 |
| L - aspartyl - 2,5 - dihydro-L-phenylalanine, methyl ester | 1.8 |
| Povidone (polyvinylpyrrolidine) | 0.1 |
| Glycerin | 10.0 |
| Sodium benzoate | 0.1 |
| Methylparaben | 0.1 |
| Distilled water | 68.9 |

EXAMPLE 8

A dry mix is prepared containing the following ingredients:

| | G. |
| --- | --- |
| Sodium saccharin | 5.0 |
| L-aspartyl-L-phenylglycine, methyl ester | 10.0 |
| Calcium lactate | 25.0 |
| Acacia powder | 60.0 |

The foregoing ingredients are mixed, wet-granulated with a liquid containing 50% water and 50% alcohol SD–3A, and dried to give a granular free-flowing powder.

EXAMPLE 9

A bulk sweetener is prepared by mixing the following ingredients:

| | G. |
|---|---|
| Sodium saccharin | 0.8 |
| L-aspartyl-L-phenylglycine, methyl ester | 2.0 |
| Hydrolyzed corn syrup solids | 54.0 |
| Distilled water | 43.2 |

The foregoing composition is warmed and spray dried to form a sweetener which may be substituted for sugar on a volume per volume basis.

EXAMPLE 10

A composition is prepared as in Example 9, aerated, poured on drying trays, dried in a vacuum oven and particulated to give a bulk sweetener which can be substituted for sugar on a volume per volume basis.

What is claimed is:

1. A composition comprising saccharin and, relative to the saccharin, an amount of a dipeptide effective to mask the aftertaste of saccharin, the dipeptide being of the formula

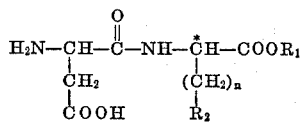

wherein the carbon marked with an asterisk is of the L-configuration, $n$ is an integer from 0 to 5, $R_1$ is an alkyl radical of up to 6 carbon atoms, an alkyl-aryl or alicyclic radical of up to 10 carbon atoms, and $R_2$ is a mono- or di-unsaturated alicyclic radical of up to 8 carbon atoms, or, when $n$ is 0, a phenyl radical.

2. A composition according to claim 1 wherein the amount of dipeptide is at least about 2% that of the saccharin.

3. A composition according to claim 1 wherein the dipeptide is L-aspartyl-L-phenylglycine, the dipeptide being present in an amount at least about 8% that of the saccharin.

4 A composition according to claim 1 wherein the dipeptide is L-aspartyl-2,5-dihydro-L-phenylalanine, the dipeptide being present in an amount at least about 2% that of the saccharin.

5. A composition according to claim 1 containing about 12 parts of saccharin and at least about 1 part of L-aspartyl-L-phenylglycine.

6. A composition according to claim 5 wherein the dipeptide is in the form of the methyl ester.

7. A composition according to claim 1 containing about 50 parts of saccharin and at least about 1 part of L-aspartyl-2,5-dihydro-L-phenylalanine.

8. A composition according to claim 7 wherein the dipeptide is in the form of the methyl ester.

9. A composition according to claim 1 containing about 1 part of dipeptide to form about 1 part to about 50 parts of saccharin.

10. A composition according to claim 1 containing about 1 part of dipeptide to from about 1.5 parts to about 15 parts of saccharin.

11. A composition according to claim 1 containing about 1 part of dipeptide to form about 2.5 parts to about 12 parts of saccharin.

12. A method of masking the aftertaste of saccharin which comprises adding to the saccharin a sweet tasting dipeptide of claim 1, the amount of the dipeptide being effective to mask the aftertaste of saccharin.

13. A composition according to claim 1 together with a non-toxic carrier.

References Cited

UNITED STATES PATENTS

| 2,761,783 | 3/1954 | Ferguson | 99—141 |
| 3,492,131 | 1/1970 | Schlatter | 99—141 |
| 3,475,403 | 10/1969 | Mazur et al. | 260—112.5 |

FOREIGN PATENTS

| 602,572 | 8/1960 | Canada. |

OTHER REFERENCES

Mazur et al., Structure-Taste Relationships of Some Dipeptides, Journal of The American Chemical Society 91:10, May 7, 1969, pp. 2684–2691.

RAYMOND N. JONES, Primary Examiner

ROGER B. ANDEWELT, Assistant Examiner

U.S. Cl. X.R.

260—1125